United States Patent Office 3,224,167
Patented Dec. 21, 1965

3,224,167
MODIFIED ZEOLITIC MOLECULAR SIEVES
AND PROCESS FOR PRODUCING SAME
Robert A. Jones, Snyder, N.Y., assignor to Union Carbide Corporation, a corporation of New York
No Drawing. Filed Jan. 21, 1963, Ser. No. 252,560
9 Claims. (Cl. 55—35)

The present invention relates to type A zeolitic molecular sieves having reduced apparent pore sizes and a process for reducing the apparent pore size of such type A zeolitic molecular sieves.

It is known in the art that the adsorptive properties, i.e. selectivity and capacity, of zeolitic molecular sieves may be modified by partial loading of an activated sample with water or other sorbates, or by varying the temperature and pressure at which the adsorbent is activated, i.e. the degree of dehydration. Zeolitic molecular sieve adsorptive selectivity is generally based on the size and shape of the adsorbate molecule, with a preference for molecules that are polar, polarizable, or unsaturated; also, the boiling point of the adsorbate is a factor to be considered. Adsorptive capacity is determined by the amount of adsorbate taken up by the activated zeolite under given conditions of pressure and temperature. If the apparent pore size of the molecular sieve is reduced to such an extent as to substantially exclude a particular adsorbate molecule, this is both a change in selectivity as well as a reduction in capacity for that adsorbate.

Change in the apparent pore size of zeolitic molecular sieve is disclosed, for example, in several patents on zeolite A (U.S.P. 2,882,243), zeolite X (U.S.P. 2,882,244), amine-modified chabazite and mordenite (U.S.P. 2,930,447) and in the paper on zeolite A by D. W. Breck et al. [J.A.C.S. 78, 5963 (1956)]. In the case of type 4A zeolite (sodium A), preadsorption of polar molecules such as water or ammonia affects the subsequent adsorption of another material by clustering about the cations, blocking the pores and thereby reducing the apparent pore size and the capacity. For example, in U.S.P. 2,882,243 it is shown how the adsorption capacity of sodium A molecular sieve for ethane is reduced by a factor of about ten by preloading the activated sample with 7 weight percent water. U.S.P. 1,813,174 to A. B. Lamb (1931) dicloses the selectivity of chabazite for oxygen over hydrogen as a function of the degree of dehydration. In a 1936 publication, Lamb and Woodhouse (J.A.C.S. 58, 2637) describe the adsorptive behavior of chabazite and how it changes in selectivity and capacity during progressive dehydration.

In the adsorption art, a steam treatment of molecular sieve adsorbents for desorption purposes is known. For example, in U.S.P. 2,818,455, Ballard et al. state that steam, when used as a desorbing fluid for molecular sieve adsorbents containing adsorbed straight-chain hydrocarbons, may reduce the adsorption capacity of the adsorbent for such hydrocarbons. In U.S.P. 2,886,508 and U.S.P. 2,894,998, Hess et al. teach that steam is a preferred medium for desorbing straight-chain hydrocarbons from molecular sieve adsorbents, particularly when the adsorbent is thereafter purged to remove adsorbed steam. In U.S.P. 2,899,379 Wilchinsky et al. disclose the loss in capacity and deterioration of type 5A adsorbent when steam stripping is used.

Molecular sieves have been found to have great utility in purification of halogenated hydrocarbon refrigerant containing systems, particularly the halogenated ethane and methane derivatives such as monochlorodifluoromethane, monochloropentafluoroethane, trichlorotrifluoroethane, dichlorotetrafluoroethane, tetrachlorodifluoroethane, dichloromonofluoromethane, tetrafluoromethane, dichlorodifluoromethane, monochlorotrifluoromethane, trichloromonofluoromethane, and methyl chloride. In these systems it is necessary to utilize a molecular sieve wherein the apparent pore size of the sieve is such that water is adsorbed in the cavities of the sieve while the refrigerant is excluded. Such systems are designed to operate over extended periods of time.

It has been found that when molecular sieves are used which have apparent pore sizes only slightly smaller than the molecules of refrigerant material being purified, there is a small amount of decomposition of the refrigerant and loss in crystallinity of the molecular sieve which, though it may be of minor consequence over short periods of time, after extended periods may result in considerably more significant disadvantages. For example, in using sodium zeolite A for sustained periods in systems containing monochlorodifluoromethane, it has been found that under some conditions monochlorodifluoromethane is decomposed and the molecular sieve loses its capacity to hold water to some extent. Sodium zeolite A is especially useful in purifying refrigerant systems because of its characteristically high water capacity, particularly at low partial pressures.

Theoretically, sodium zeolite A molecular sieves should not adsorb $CHF_2Cl$ on the basis of a comparison between the molecular size of the refrigerant and the apparent pore size of sodium zeolite A; but, apparently some minute amount of this refrigerant finds its way into the inner adsorption area of the molecular sieve and after extended periods of operation the decomposition of the refrigerant and loss of the crystallinity of the molecular sieve do not permit optimum performance. Molecular sieves are also useful in drying other gases and in recovering other adsorbable components from gas mixtures.

It is an object of the present invention to provide sodium A zeolitic molecular sieves having a reduced apparent pore size while retaining their crystallinity and characteristically high capacity for water molecules.

It is another object to provide a sodium A zeolitic molecular sieve adsorbent having a reduced apparent pore size particularly amenable for use in the removal of water from streams of halogenated methane and ethane derivatives in a refrigerant system.

It is another object to provide sodium A zeolitic molecular sieves having a reduced apparent pore size, which reduced apparent pore size is unchanged after activation of the molecular sieve.

It is a further object to provide a process for reducing the apparent pore size of type A zeolitic molecular sieves wherein the reduced apparent pore size of the molecular sieves is retained after activation of the zeolitic molecular sieves under standard activation conditions.

It is a still further object to provide an improved adsorption process for purifying a refrigerant system containing halogenated methane and ethane derivatives as refrigerants, with a molecular sieve adsorbent but without experiencing detrimental decomposition of the refrigerant.

The product of the present invention comprises steam-treated, three-dimensional crystalline sodium A zeolitic molecular sieves characterized by a reduced uniform apparent pore size. The apparent pore size remains unaltered after heating, subsequent to steam treatment, to known activation temperatures employed in activating sodium zeolite A. The steam-treated sodium A zeolitic molecular sieves substantially retain the original water capacity and crystallinity of the untreated standard sodium A adsorbent.

The phrase "apparent pore size" as used herein may be defined as the maximum critical dimension of the molecular species which is adsorbed by the zeolitic molecular sieve in question under normal conditions. The critical dimension is defined as the diameter of the smallest cylinder which will accommodate a model of the molecule constructed using the best available values of bond distances, bond angles, and Van der Waals' radii. The apparent pore size will always be larger than the structural of effective pore diameter, which may be defined as the free diameter of the appropriate silicate ring in the zeolite structure.

The phrase "activated zeolite" is used to define a zeolite which has been treated at elevated temperature (e.g., activated) to remove at least a portion of the water from the inner cavities in its three-dimensional crystalline structure to develop molecular sieve adsorbent properties. The phrase "zeolitic molecular sieve" is used herein synonymously with the phrase "activated zeolite" and to connote the same meaning as the phrase "activated zeolite."

The product of the present invention also includes agglomerates and shaped bodies containing steam-treated, three-dimensional crystalline sodium A zeolitic molecular sieves. The phrase "agglomerates and shaped bodies containing steam-treated, three-dimensional crystalline sodium A zeolitic molecular sieves" is defined to include coherent masses of such steam-treated molecular sieves with or without binding materials such as clay or other binder materials. Type A zeolites are often synthesized as fine crystalline bodies which, to be useful in most large-scale adsorption or catalyst processes, are made into agglomerates. One method of agglomerating these finely crystalline bodies is by combining them with a clay binder as described and claimed in U.S. Patent No. 2,973,327, issued February 28, 1961, in the name of W. J. Mitchell et al. Type A zeolites may also be prepared directly in the form of shaped, polycrystalline masses according to the methods described and claimed in copending applications Serial No. 58,200, now U.S. Patent No. 3,119,660, and Serial No. 58,199, now U.S. Patent No. 3,119,659, both issued January 28, 1964.

The novel products disclosed herein are prepared by contacting either activated or unactivated sodium A zeolites with steam at a temperature ranging from about 250° C. to about 650° C., and preferably from about 250° C. to about 450° C. for a period of time ranging up to about 200 hours at a water vapor pressure of greater than about 25 mm. Hg and preferably greater than 100 mm. Hg.

Sodium zeolite A is a three-dimensional crystalline sodium aluminosilicate having the general formula:

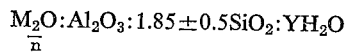

$$\frac{M_2O}{n}:Al_2O_3:1.85\pm0.5SiO_2:YH_2O$$

wherein M is at least one metal of valence $n$ and is at least 75% sodium, and wherein Y may be any value up to about 6. A detailed description of type A zeolites, and processes for producing the same, is contained in U.S. Patent No. 2,882,243, issued April 14, 1959, to Robert M. Milton. Sodium A zeolites are activated by removing at least a part of the water of crystallization, as by heating to an activation temperature. Activation of sodium A zeolites is fully described in the aforementioned U.S. Patent No. 2,882,243 to R. M. Milton. Sodium zeolite A may be activated by heating it in either air or a vacuum or other appropriate gas to temperatures as high as 600° C. For the purposes of the present invention, an activation temperature of at least 300° C. is generally used but 350° C. is preferred. Standard activation conditions for sodium zeolite A are about 350° C. under high vacuum; i.e., less than about 0.1 mm. Hg absolute pressure. These conditions are maintained until substantially all of the water is removed. In the fully activated condition, sodium zeolite A contains less than about 2 weight percent water.

In the present invention, the apparent pore size is reduced by subjecting activated or unactivated sodium A zeolites to a steam treatment. Subsequent exposure of the steam-treated molecular sieves to the standard activation conditions employed in activating sodium A zeolites does not, surprisingly enough, make the apparent pore size revert to that possessed by the adsorbents prior to the steam treatment of the invention. Retention of the reduced apparent pore size in the present product after activation, without loss of crystallinity and water capacity, is especially unexpected in view of the hereinbefore mentioned prior art teaching wherein the detrimental effects of steam on zeolites are disclosed.

It has been found that the present product, in addition to retaining its reduced apparent pore size after activation, also retains in its characteristic crystallinity, its chemical composition and its water adsorption capacity.

The important variables to be considered in the present process are (1) temperature of the steaming treatment and (2) the water vapor concentration during steaming. In general, increasing the steaming treatment temperatures up to about 650° C. or increasing water vapor pressures above about 25 mm. Hg results in decreased apparent pore size for a given temperature and pressure in shorter treatment periods.

Following is a more detailed discussion of the relationship between apparent pore size reduction and temperature of treatment for a given time of treatment and water vapor pressure in the system during steaming. Sodium silicate bonded sodium A zeolitic molecular sieve agglomerates were used as the starting material for the tests resulting in the data shown in Tables I and II. Oxygen was used as the adsorbate in these tests. At −183° C. and −196° C., oxygen, having a molecular diameter of less than 4 angstroms, is readily adsorbed in standard sodium A molecular sieves having an apparent pore size of approximately 4 angstrom units. Thus, oxygen adsorption measurements are a convenient means for determining changes in apparent pore size.

In the experiments of Table I, vacuum-activated (350° C.) sodium A molecular sieve sodium silicate-bonded agglomerates were exposed to water vapor at a pressure of 25 mm. Hg absolute at various temperatures for approximately 15 days and thereafter heated under reduced pressure to an activation temperature of 350° C. and finally exposed to oxygen at −183° C. and 700 mm. Hg absolute. The effect of increasing temperature of steaming treatment is shown.

*Table I*

| Run No. | Heating temp., °C. | $O_2$ capacity, wt. percent $O_2$/gram of product [1] |
|---|---|---|
| 1 | (²) | 19.4 |
| 2 | 25 | 19.6 |
| 3 | 150 | 18.4 |
| 4 | 250 | 10.6 |
| 5 | 300 | 6.3 |
| 6 | 350 | 0.8 |

[1] Based on activated weight.
[2] No treatment.

Table I shows the surprising reduction in the molecular sieve's capacity to adsorb oxygen after treatment in accordance with the present process whereas prior to treatment in the present process the sieves readily adsorb substantial amounts of oxygen. A temperature of about 250° C. represents the lower level at which a substantial decrease in oxygen adsorption, indicative of a reduction in apparent pore size, is experienced after treatment at water vapor pressures of approximately 25 mm. Hg absolute for extended periods of time.

Now considering the time of treatment and its effect on apparent pore size reduction, it has been found that a 24-hour treatment time at 250° C. in steam having a water vapor pressure of about 25 mm. of Hg absolute is sufficient to reduce the apparent pore size of sodium silicate-bonded agglomerates and would decrease the adsorption capacity of this type of adsorbent for $CHClF_2$ and concomitantly inhibit the decomposition thereof, as discussed in detail hereinafter. To substantially exclude oxygen from this adsorbent, greater than about 100 hours of treatment time and up to about 200 hours may be required at 250° C. at a water vapor pressure of 25 mm. of Hg absolute. Of course, higher temperatures and water vapor pressures will result in a decrease in the treatment time required to substantially reduce the apparent pore size of sodium zeolite A. In general, the duration of steam treatment according to the method of the invention may range from about .5 hour up to about 200 hours, depending upon the steaming conditions.

It has further been found that clay bonded sodium zeolite A agglomerates must be treated at a water vapor pressure of at least 700 mm. of Hg, preferably 860 mm. of Hg, to achieve substantial pore closure. It is preferred to treat these agglomerates at greater than 760 mm. of Hg to achieve optimum reduced apparent pore size.

The water vapor pressure in the present process is desirably maintained as high as possible to both decrease the treatment time required to produce substantial reduction in apparent pore size and to effect such apparent pore size reduction at the lowest possible temperature. Table II illustrates that temperature alone in the absence of water vapor will not cause apparent pore size reduction in sodium A zeolitic molecular sieves. After treatment of the sieve with water vapor at the various temperatures as specified in Table II, the samples were activated under reduced pressure at a temperature of about 350° C. prior to adsorption of oxygen at −183° C. and 700 mm. Hg.

Table II

| Gas environment | Absolute pressure, mm. Hg | Time, days | $O_2$ capacity wt. percent after heating at— | | | |
|---|---|---|---|---|---|---|
| | | | As rec'd | 25° C. | 150° C. | 350° C. |
| $H_2O$ | 25 | 14 | 19.4 | 19.6 | 18.4 | 0.8 |
| Air | 750 | 15 | 19.4 | 20.3 | 19.6 | 15.8 |

Water vapor pressures in excess of about 100 mm. of Hg (absolute pressure) are preferred for sodium silicate-bonded sodium A zeolite agglomerates and water vapor pressures in excess of 760 mm. of Hg are preferred for treating clay-bonded sodium A zeolite agglomerates.

As previously discussed, the decomposition of halogenated hydrocarbon refrigerants observed in systems containing molecular sieves has presented formidable problems in the use of such sieves as adsorbents in these refrigerant systems over extended periods of time. Following is an additional discussion of the present invention in relation to the modification of type A zeolites for use in removing water from halogenated methane and ethane-derivative refrigerants in closed refrigeration systems for extended periods of time without substantial decomposition of the refrigerant.

Decomposition of the refrigerant such as $CHClF_2$ is evident from the products of the complex decomposition reaction, namely, the non-condensable gas (principally CO), and the $Cl^-$ ion remaining in the solid adsorbent, and from the degradation of the molecular sieve as judged from X-ray and adsorption measurements. Although the decomposition reactions which result in the formation of the non-condensable gas are complex and cannot be related stoichiometrically to the percent refrigerant decomposed, the relative amounts of gas formed afford a useful means of comparing the chemical stability of various systems.

The adsorption capacity of sodium A zelolitic molecular sieves for halogenated ethane and methane derivatives can be effectively reduced by a factor of about 10 by steam treating sodium A zeolitic molecular sieve at temperatures ranging from about 250° C. to about 650° C., and preferably from about 250° C. to about 450° C. for periods of time ranging up to about 100 hours. After steam treatment, the sieve is activated at the standard activation temperature of about 350° C. prior to use as an adsorbent in the refrigeration system. Treatment periods as short as about ½ hour have been found to be sufficient to alter the apparent pore size of the sieve to such an extent as to exclude appreciable amounts of halogenated ethane and methane derivatives. Treatment for periods in excess of about 200 hours apparently does not lead to further decreases in the apparent pore size of the sieve. Treatment periods ranging from about 72 to about 96 hours are most preferred when sodium A zeolitic molecular sieve is to be used to purify refrigeration systems containing halogenated hydrocarbon refrigerants.

Temperatures ranging from about 250° C. to about 650° C., preferably between about 250° C. and 450° C., have been found useful in achieving reduced apparent pore size in sodium A zeolites according to the method of the invention as measured by the decreased adsorption of, for example, oxygen and $CHClF_2$. Temperatures lower than about 250° C. do not cause significant changes in apparent pore size compared with standard 4A adsorbents, while temperatures in excess of about 450° C. do not result in any further substantial decrease in apparent pore size compared to that of adsorbents treated in the 250° C.–450° C. range. A steaming temperature of about 350° C. for periods of about 72 to about 96 hours will give optimum apparent pore size reduction in molecular sieves to be used in purifying refrigeration systems employing halogenated hydrocarbon refrigerants.

The decomposition of $CHClF_2$ is indicated by measuring the amount of non-condensables, principally CO, formed as a product of the decomposition reactions occurring in a $CHClF_2$-molecular sieve system after various exposure times, utilizing a modification of the procedure described by Spauschus and Olsen in Refrigeration Engineering, vol. 67, February 1959, on page 25. The following Example I illustrates this procedure.

EXAMPLE I

Approximately 1.7 g. of standard (i.e. non-steam treated) type A molecular sieve were weighed into 75 cc. pressure vessels. The sieve was activated for 1 hour at 460° C. and the weight loss on activation was determined. Subsequently, about 40 g. of $CHClF_2$ were condensed into each vessel. These vessels were then submerged about halfway into a 140° F. constant temperature water bath so that there would be continual refluxing of the refrigerant. At periodic intervals the vessels were removed from the bath, immersed in liquid nitrogen, and the uncondensed gas was withdrawn and measured volumetrically. A second sampling after melting and refreezing allowed corrections to be made for the amount of CO entrained in the solid during freezing. Typical analyses of two different gas samples are shown in Table A.

Table A

| Constituent | Concentration, mol percent | |
|---|---|---|
| | Sample No. 1 | Sample No. 2 |
| $H_2$ | 0.08 | 0.13 |
| $H_2O$ | 0.57 | 0.99 |
| CO | 98.6 | 97.2 |
| Air | 0.64 | 1.46 |
| Ar | 0.01 | 0.08 |
| $CO_2$ | 0.06 | 0.13 |
| $CHClF_2$ | (1) | (1) |

[1] Not detected

To illustrate the remarkable decrease in the capacity of steam-treated clay-bonded adsorbents for halogenated hydrocarbons and retention of water capacity and crystallinity by the adsorbent, two batches of clay-bonded sodium A molecular sieve were obtained. One quantity (unactivated) was steam-treated for 25 minutes at a temperature of around 550° C. at a water vapor pressure of about 760 mm. of Hg and activated by heating to a temperature of 350° C. for 18.5 hours. The other batch was exposed to $CHClF_2$ without prior steam treatment and after activation at about 350° C. Table III shows the effect of exposing these two batches of molecular sieves to $CHClF_2$ for various periods at various temperatures. Note that two samples of the steam-treated molecular sieves were exposed to $CHClF_2$ at each of various time intervals to show the reproducibility of the apparent pore size reduction effect.

Items 1–3 show the progressive increase in adsorption of $CHClF_2$ with increased exposure times in non-steam treated molecular sieve as contrasted with the consistently low adsorptive capacity for $CHClF_2$ of steam-treated molecular sieve over the same extended exposure time.

Items 4 and 5 show a comparison of the water capacity of the steam-treated and non-steam treated sodium A adsorbents before and after exposure to $CHClF_2$.

Items 6 and 7 compare the $Cl^-$ content of the respective products before and after exposure to $CHClF_2$. Increased $Cl^-$ contents are indicative of increased adsorption of $CHClF_2$.

Item 8 is a comparison of the ability of each of the different products; i.e., steam-treated and non-steam treated, to retain crystallinity after exposure to $CHClF_2$.

upon exposure to halogenated hydrocarbons, extremely low capacities for halogenated hydrocarbons, and very little tendency to be associated with decomposition of halogenated hydrocarbons.

The extent of apparent pore size reduction experienced by molecular sieves after the present novel steam treatment is further illustrated in Table IV. This table shows a comparison of $CHClF_2$ adsorption capacity for steam-treated sodium A molecular sieve as compared to two non-steam treated type A molecular sieve samples of smaller apparent pore size; namely, 40 percent potassium-exchanged zeolite A and 100 percent potassium-exchanged zeolite A. The apparent pore size of the zeolites decreases with increasing extent of exchange of potassium for sodium. In obtaining these data, the several activated adsorbent materials were placed in a McBain adsorption system and allowed to remain in contact with $CHClF_2$ for various periods of time at one atmosphere pressure.

The data in Table IV indicate that the steam treatment effectively reduced the $CHClF_2$ adsorption capacity of a larger pore molecular sieve; i.e., sodium A to that of a smaller pore sieve; e.g., 100 percent of potassium-exchanged type A sieve, and most importantly without loss of water capacity in the steam-treated sieve as shown by item 5 in Table III. This aspect of the present invention is of considerable importance because it permits use of the characteristically high water capacity of sodium A molecular sieves to good advantage in the removal of water from refrigeration systems containing halogenated

*Table IV*

| Adsorbent | Untreated sodium A | 40% K-exchanged type A | 100% K-exchanged type A | Sodium A steamed 24 hours at 350° C. |
|---|---|---|---|---|
| Amount $CHClF_2$ adsorbed (g./100 g.) after 16 hours at 25° C. | 4.7 | 0.2 |  | 0.5 |
| Amount $CHClF_2$ adsorbed (g./100 g.) after 19 hours at 25° C. | 15.1 | 0.7 | 0.3 | 0.4 |
| Amount $CHClF_2$ adsorbed (g./100 g.) after 6 days more at 60° C. (140° F.) | 17.6 | 2.5 | 0.7 | 0.7 |

*Table III*

| Item |  | Amount of $CHClF_2$ adsorbed (g./100 g. of sieve) | | |
|---|---|---|---|---|
| | | Sodium A molecular sieves untreated | Steam treated sodium A molecular sieves | |
| | | | Run 1 | Run 2 |
| 1 | Exposure to $CHClF_2$ for 19.5 hours at 25° C. | 4.9 | 1.0 | 1.5 |
| 2 | Exposure to $CHClF_2$ 66.5 for hours at 25° C. | 12.9 | 1.4 | 2.4 |
| 3 | Exposure to $CHClF_2$ for 6 days more at 60° C. (140° F.). | 23.3 | 1.8 | 3.5 |
| 4 | Water capacity of product at 5.7 mm. and 25° C., (gm./100 g. of activated adsorbent) before exposure to $CHClF_2$. |  |  | 20.6 |
| 5 | Water capacity of product at 5.7 mm. and 25° C., (g. adsorbed/100 g. activated adsorbent) after exposure to $CHClF_2$. | 4.7 | 20.1 | 19.3 |
| 6 | $Cl^-$ content (wt. percent) of molecular sieve before exposure to $CHClF_2$. | 0.02 | 0.01 | 0.01 |
| 7 | do | 5.7 | 0.28 | 0.52 |
| 8 | Percent original crystallinity retained (from X-ray data). | 6 | 82 | 89 |

From the data presented in Table III, it is readily apparent that the present steam treatment of zeolitic molecular sieves results in a new molecular sieve product having a reduced apparent pore size, high crystalline stability ethane and methane refrigerants without experiencing substantial loss of crystallinity by the adsorbent or substantial decomposition of the refrigerant. Though 100 percent K-exchanged type A molecular sieves "apparently" have a low adsorptive capacity for $CHClF_2$, they also have a water capacity approximately 10 percent lower than that of sodium A zeolites.

Table V summarizes detailed data on the decomposition of $CHClF_2$ as measured by determining the extent of evolution of CO over extended periods of time in a molecular sieve $CHClF_2$ system in accordance with the Spauchus and Olsen method previously mentioned. Also, water capacity measurements and $Cl^-$ measurements are shown. In securing the data presented in Table V, a mixture of $CHClF_2$ and molecular sieve was prepared in a ratio of 23:1 molecular sieve to $CHClF_2$ by weight and heated in closed vessels to a temperature of 140° F.

Table V shows that the amount of CO formed was greater for the untreated molecular sieve samples than for the treated samples, the least amount being observed in item 5 using the sample steamed for 96 hours. Before exposure to the refrigerant, the same used in item 5 had a water capacity of 20.8 g./100 g. at 7.2 mm. Hg and 25° C., so that there was practically no loss in water capacity as a result of the test. The untreated sodium A adsorbent (item 3) which reacted with the refrigerant to produce a relatively large amount of CO exhibited a greatly decreased water capacity and high $Cl^-$ content in the adsorbent. Sodium A molecular sieve steamed in such a manner as to achieve a reduction in apparent pore size, such as for 96 hours at 350° C. is preferred as a stable refrigerant desiccant.

Table V
DECOMPOSITION OF CHClF$_2$ AT 140° F.

| Item | Adsorbent | Total volume of CO formed (c.c.S.T.P./g. adsorbent) | | | | Percent Cl- in hydrated product | H$_2$O vapor adsorption on product, 4.2 mm. 32° C., g./100 g. |
|---|---|---|---|---|---|---|---|
| | | 1 week | After 2 weeks | 3 weeks | 4 weeks | | |
| 1 | No adsorbent; CHClF only | | | about 0.3 | | | |
| 2 | Non-steam treated sodium A | | 4.0 | 5.3 | | 1.5 | |
| 3 | Non-steam treated sodium A agglomerates | 2.9 | 3.6 | 4.2 | | 3.2 | 9.3 |
| 4 | Sodium A steamed 24 hours at 350° C. and 1 atm. | | 0.6 | 1.0 | 1.2 | 0.6 | 24.3 |
| 5 | Sodium A steamed 96 hours at 350° C. and 1 atm. | | 0.2 | 0.3 | 0.3 | 0.1 | 19.8 |

Although preferred embodiments of this invention have been described in detail, it is to be understood that modifications of the process and products may be made and that some features may be employed without others, all within the spirit and scope of the invention.

What is claimed is:

1. Process for reducing the apparent pore size of sodium A zeolitic molecular sieve which comprises contacting said molecular sieve with steam at a water vapor pressure of greater than 25 mm. Hg at a temperature within the range of about 250° C. to about 650° C. and for a time period of from about 0.5 to about 200 hours, said period of time, water vapor pressure and temperature being commensurate such that the oxygen adsorption capacity of the steam treated molecular sieve after reactivation is less than about 10.6 weight percent measured at −183° C. and 700 mm. Hg pressure.

2. The sodium A zeolitic molecular sieve of reduced apparent pore size prepared by the process of claim 1.

3. Process according to claim 1 wherein the temperature range is from about 250° C. to about 450° C.

4. Process for reducing the apparent pore size of sodium A zeolitic molecular sieve in a clay-bonded agglomerate thereof which comprises contacting said clay-bonded molecular sieve agglomerate with steam at a water vapor pressure of greater than 700 mm. Hg at a temperature within the range of about 250° C. to about 650° C. and for a time period of from about 0.5 to about 200 hours, said period of time, water vapor pressure and temperature being commensurate such that the oxygen adsorption capacity of the steam treated molecular sieve after reactivation is less than about 10.6 weight percent measured at −183° C. and 700 mm. Hg pressure.

5. The clay-bonded agglomerate of sodium A zeolitic molecular sieve of reduced apparent pore size prepared by the process of claim 4.

6. Process according to claim 4 wherein the temperature range is from about 250° C. to about 450° C., the period of time is from about 72 to 96 hours, and the water vapor pressure is greater than 760 mm. Hg.

7. Process for reducing the apparent pore size of sodium A zeolitic molecular sieve in a sodium silicate bonded agglomerate thereof which comprises contacting said sodium silicate bonded agglomerate with steam at a water vapor pressure of greater than 100 mm. Hg at a temperature within the range of about 250° C. to about 450° C. and for a time period of from about 72 to about 96 hours, said period of time, water vapor pressure and temperature being commensurate such that the oxygen adsorption capacity of the steam treated molecular sieve after reactivation is less than about 10.6 weight percent measured at −183° C. and 700 mm. Hg pressure.

8. The sodium silicate bonded agglomerate of sodium A zeolitic molecular sieve of reduced apparent pore size prepared by the process of claim 7.

9. Process for removing water from a water contaminated gas stream comprising at least one member of the class consisting of partially halogenated methane and partially halogenated ethane which comprises contacting said water-contaminated gas stream with a sodium A zeolitic molecular sieve of reduced pore size, said molecular sieve being prepared by the process of claim 1.

References Cited by the Examiner
UNITED STATES PATENTS

| | | | |
|---|---|---|---|
| 2,767,148 | 10/1956 | Plank | 252—455 X |
| 2,882,243 | 4/1959 | Milton | 55—75 X |
| 2,894,998 | 7/1959 | Hess et al. | 55—75 X |
| 2,973,327 | 2/1961 | Mitchell et al. | 252—455 X |

REUBEN FRIEDMAN, *Primary Examiner.*